US 8,984,545 B2

(12) United States Patent
Chen et al.

(10) Patent No.: US 8,984,545 B2
(45) Date of Patent: Mar. 17, 2015

(54) CD PLAYER ADAPTED FOR MAJOR-DIAMETER AND MINOR-DIAMETER CD DETECTION

(71) Applicant: Valley Wood Electrical (Shenzhen) Co., Ltd., Shenzhen, Guangdong (CN)

(72) Inventors: Yung Ta Chen, Guangdong (CN); Akeshi Shitamichi, Guangdong (CN); Rei Shukuya, Guangdong (CN); Minsheng Lu, Guangdong (CN)

(73) Assignee: Valley Wood Electrical (Shenzhen) Co., Ltd., Shenzhen, Guangdong (CN)

( * ) Notice: Subject to any disclaimer, the term of this patent is extended or adjusted under 35 U.S.C. 154(b) by 0 days.

(21) Appl. No.: 14/093,702

(22) Filed: Dec. 2, 2013

(65) Prior Publication Data

US 2014/0181848 A1    Jun. 26, 2014

(30) Foreign Application Priority Data

Dec. 20, 2012 (CN) .......................... 2012 1 0557935

(51) Int. Cl.
*G11B 17/04* (2006.01)
*G11B 17/051* (2006.01)

(52) U.S. Cl.
CPC ................................ *G11B 17/0515* (2013.01)
USPC ........................................... 720/619; 720/626

(58) Field of Classification Search
CPC .................................................. G11B 17/0515
USPC .................. 720/619–624, 626, 632, 633, 641
See application file for complete search history.

(56) References Cited

U.S. PATENT DOCUMENTS 6,542,453 B1 * 4/2003 Yamada et al. ............... 720/616

* cited by examiner

*Primary Examiner* — Joseph Feild
*Assistant Examiner* — Gustavo Polo
(74) *Attorney, Agent, or Firm* — Jackson IPG PLLC (57) ABSTRACT

A CD player, which comprises a conveying roller, a first sensing rod, a second sensing rod, a linkage member, a first switch and a second switch; wherein the linkage member is used for transmitting the rotation of the first sensing rod to the second sensing rod and provided with a first retaining part, a first clamping part, a second retaining part, a second clamping part; the two retaining parts are respectively arranged on both sides of a centerline of a CD conveying path; when the first sensing rod is prevented from rotating by the first retaining part, the second sensing rod is used for releasing the behavior; and when the second sensing rod is prevented from rotating by the second retaining part, the first sensing rod is used for releasing the behavior. The player can avoid the malfunction of a major-diameter CD detection switch and has a very simple structure.

2 Claims, 8 Drawing Sheets

CD PLAYER ADAPTED FOR MAJOR-DIAMETER AND MINOR-DIAMETER CD DETECTION

FIELD OF THE INVENTION

The invention relates to a CD player, in particular to a suction-type CD player capable of avoiding the malfunction of a major-diameter CD detection switch during the insertion of a minor-diameter CD.

BACKGROUND OF THE INVENTION

In a suction-type CD player provided with a CD insertion opening, in which a CD inserted into the insertion opening is conveyed to a playback position by the rotation of a conveying roller, the dimension of the CD inserted into the insertion opening is subjected to electrical detection and the subsequent CD playback action and CD ejecting action are controlled. There are two types of CDs in view of the diameter: one is 12 cm CD (hereafter referred to as major-diameter CD) and the other is 8 cm CD (hereafter referred to as minor-diameter CD).

In order to detect the dimension of the CD, a detection component (sensing rod) subjected to clamping movement with an outside diameter of the inserted CD is arranged at the insertion opening. With the insertion of a major-diameter CD, the detection component moves substantially and actuates an electronic switch to operate. However, when a minor-diameter CD is inserted towards one side of the insertion opening, the detection component may move by the same amount as the time when the major-diameter CD is inserted. As a result, the detection component actuates the electronic switch to operate, and hence the subsequent control action can be hindered. In order to overcome the defect, in a CD player disclosed in the Japanese Unexamined Patent Application Publication No. 2012-14814 (hereafter referred to as Patent Document 1), a minor-diameter CD detection switch S1 and a major-diameter detection switch S2 are arranged; and when a minor-diameter CD is inserted into an insertion opening, the movement amount of a detection component is controlled so that the S2 cannot operate.

Moreover, in the Japanese Unexamined Patent Application Publication No. 2004-22040 (hereafter referred to as Patent Document 2), a detection component forcibly enables the center of a minor-diameter CD to be consistent with the center of an insertion opening. In the Patent Document 2, although the detection component does not actuate an electronic switch of a major-diameter CD to operate, the effect of avoiding the malfunction of a major-diameter CD detection switch can be expected as the detection component forcibly enables the center of the minor-diameter CD to be consistent with the center of the insertion opening.

The CD player disclosed in the Patent Document 1 has a complex structure and comprises the minor-diameter CD detection switch S1, the major-diameter CD detection switch S2, a "switch operation member" clamped with the detection component, and a "trigger rod" used for actuating the S1 as well when the minor-diameter CD is inserted towards the right side of the insertion opening. Moreover, the minor-diameter CD is allowed to be inserted towards one side of the insertion opening. When the minor-diameter CD is inserted towards one side of the insertion opening, as the center of the minor-diameter CD is greatly deviated from a centerline of a CD conveying path, the minor-diameter CD tends to be difficult to be guided onto a rotary disk.

Furthermore, in the CD player disclosed in the Patent Document 2, as the center of the minor-diameter CD is forcibly consistent with the center of the insertion opening, an insertion window of the minor-diameter CD is smaller, and hence the minor-diameter CD tends to be difficult to be inserted.

SUMMARY OF THE INVENTION

The objective of the invention is to provide a CD player capable of avoiding the malfunction of a major-diameter CD detection switch via a simple structure. Moreover, in the CD player, a minor-diameter CD can be also stably mounted on a rotary disk and be easily inserted into an insertion opening.

In order to achieve the objective, the CD player of the first invention comprises a conveying roller, a first sensing rod, a second sensing rod, a linkage member, a first switch and a second switch, wherein the conveying roller is used for conveying a CD from a CD insertion opening to a playback baseplate; the first sensing rod and the second sensing rod are driven to rotate by the periphery of the CD inserted into the insertion opening; the linkage member is used for transmitting the rotation of the first sensing rod to the second sensing rod; the first switch is used for receiving the rotation of the two sensing rods and starting the conveying roller; and the second switch is clamped with one sensing rod near rotary terminals of the two sensing rods and used for operating by determining the outside diameter of the CD. Moreover, the linkage member includes a first retaining part, a first clamping part, a second retaining part and a second clamping part, wherein the first retaining part is used for preventing the first sensing rod from rotating independently; the first clamping part is used for enabling the linkage member to move towards the insertion opening during the rotation of the first sensing rod; the second retaining part is used for preventing the second sensing rod from rotating independently; and the second clamping part is used for enabling the linkage member to move towards the insertion opening during the rotation of the second sensing rod. Furthermore, the first retaining part and the second retaining part are respectively arranged on both sides of a centerline of a CD conveying path and have different distances from the first retaining part and the second retaining part to the centerline of the CD conveying path; the second sensing rod is used for releasing the behavior of the first retaining part in preventing the first sensing rod from rotating when the first sensing rod is prevented from rotating by the first retaining part; and the first sensing rod is used for releasing the behavior of the second retaining part in preventing the second sensing rod from rotating when the second sensing rod is prevented from rotating by the second retaining part.

In the CD player of the second invention, the first retaining part is arranged on an end portion of the first clamping part, adjacent to the center of the CD conveying path, and the second retaining part is arranged in a central portion of the second clamping part.

According to the first invention, due to the structure of arranging the first retaining part for preventing the first sensing rod from rotating independently and the second retaining part for preventing the second sensing rod from rotating independently, inside the linkage member, the second switch arranged near the rotary terminals of the two sensing rods and used for operating by determining the outside diameter of the CD does not operate when a minor-diameter CD is inserted by being deviated from the insertion opening, so that the malfunction of the major-diameter CD detection switch can be avoided.

According to the second invention, as the second retaining part is arranged in a central portion of the second clamping part, the second sensing rod is controlled when rotating independently by half of the maximum rotation amount, and hence the center of the minor-diameter CD cannot be greatly deviated from the center of the CD conveying path, and consequently the minor-diameter CD can be stably mounted on a rotary disk. Moreover, as the second sensing rod is controlled when rotating independently by half of the maximum rotation amount, an insertion window of the minor-diameter CD insertion opening is expanded, and hence the minor-diameter CD can be smoothly inserted.

DETAILED DESCRIPTION OF THE PREFERRED EMBODIMENTS

The linkage member used for transmitting the rotation of the first sensing rod to the second sensing rod is provided with a first retaining part, a first clamping part, a second retaining part and a second clamping part, wherein the first retaining part is used for preventing the first sensing rod from rotating independently; the first clamping part is used for enabling the linkage member to move towards the insertion opening during the rotation of the first sensing rod; the second retaining part is used for preventing the second sensing rod from rotating independently; and the second clamping part is used for enabling the linkage member to move towards the insertion opening during the rotation of the second sensing rod. Moreover, the distances from the first retaining part and the second retaining part to the centerline of the CD conveying path are different; when the first sensing rod is prevented from rotating by the first retaining part, the second sensing rod is used for releasing the behavior of the first retaining part in preventing the first sensing rod from rotating; and when the second sensing rod is prevented from rotating by the second retaining part, the first sensing rod is used for releasing the behavior of the second retaining part in preventing the second sensing rod from rotating.

Figure 1:
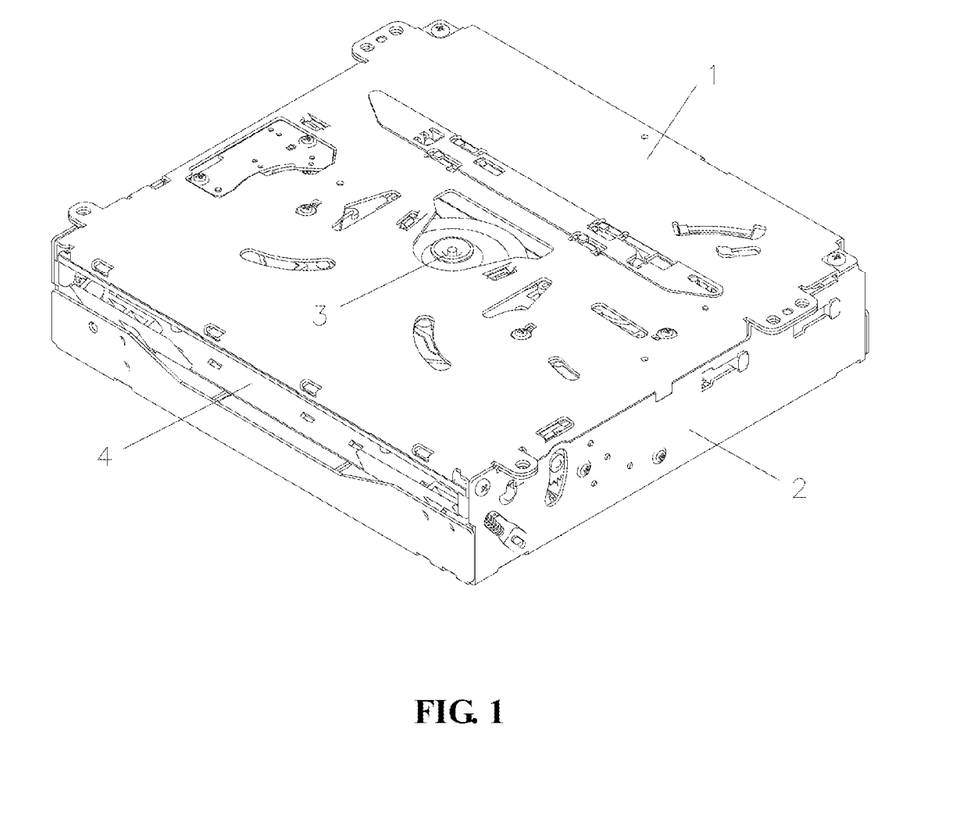
FIG. 1 is an outside view of a CD player of an embodiment of the invention.

The CD player of the invention is as illustrated in FIGS. 1 to 8. FIG. 1 is an outside view of the CD player, in which a square metallic frame body consists of an upper baseplate 1 and a lower baseplate 2; a playback baseplate provided with a rotary disk 3 and a signal read-write head is arranged on the inside surrounded by the upper baseplate 1 and the lower baseplate 2; and an insertion opening 4 used for mounting a CD on the playback baseplate is arranged on an end surface of the lower baseplate 2.

Figure 2:
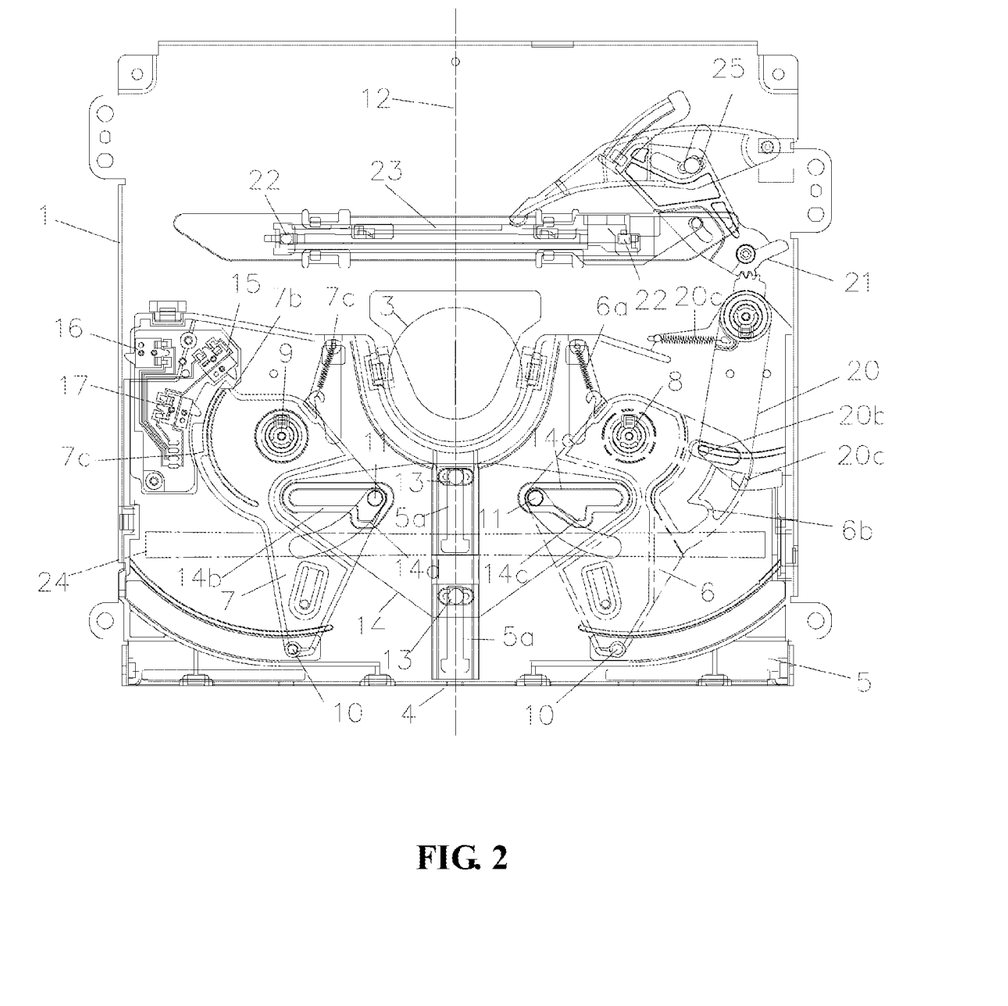
FIG. 2 is a cut-away view of the CD player.

FIG. 2 is a plan view seen from a metal plate of the upper baseplate 1, in which a right sensing rod 6 (the first sensing rod) and a left sensing rod 7 (the second sensing rod) are respectively supported by a first shaft 8 and a second shaft 9 by means of smooth rotation, on a resin substrate 5 made of synthetic resins, and the first shaft 8 and the second shaft 9 are respectively arranged at left and right positions with equal distance to a centerline 12 of a CD conveying path.

A sensing bolt 10 projected in the insertion opening 4 and slideably connected with the periphery of a CD inserted into the insertion opening is arranged on the right sensing rod 6; a small cylinder 11 is projected in a substantial middle part of the sensing bolt 10 and the first shaft 8; and the right sensing rod 6 is applied by a clockwise rotary force by a first spring 6a with the first shaft 8 as the center.

A sensing bolt 10 projected in the insertion opening 4 and slideably connected with the periphery of the CD inserted into the insertion opening 4 is also arranged on the left sensing rod 7; a small cylinder 11 is projected in a substantial middle part of the sensing bolt 10 and the second shaft 9; and the left sensing rod 7 is applied by a counterclockwise rotary force by a second spring 7a with the second shaft 9 as the center.

Two guide channels 5a are formed on the resin substrate 5 along the centerline 12 of the CD conveying path; and a connecting plate 14 (i.e. the linkage member) provided with a guide shaft 13 embedded with the guide channels 5a is arranged to freely advance or retreat towards the insertion opening 4. In addition, the connecting plate 14 is provided with a first channel 14a (i.e. the first clamping part) and a second channel 14b (i.e. the second clamping part), in which the first channel 14a is embedded with the small cylinder 11 of the right sensing rod 6 and extended in the direction perpendicular to the centerline 12 of the CD conveying path, and the second channel 14b is embedded with the small cylinder 11 of the left sensing rod 7 and extended in the direction perpendicular to the centerline 12 of the CD conveying path. Moreover, a first recess 14c (i.e. the first retaining part) is formed on a central portion of the first channel 14a towards the insertion opening 4, and a second recess 14d (i.e. the second retaining part) is formed on an end portion of the second channel 14b, adjacent to the centerline 12 of the CD conveying path. That is, the distances from the first recess 14c and the second recess 14d to the centerline 12 of the CD conveying path are different, and the first recess 14c is arranged farther than the second recess 14d, relative to the centerline of the CD conveying path.

When the right sensing rod 6 independently resists the force of the first spring 6a and rotates counterclockwise, the small cylinder 11 actuates the first channel 14a so that the connecting plate 14 moves towards the insertion opening 4. Moreover, when the small cylinder 11 is embedded with the first recess 14c, the right sensing rod 6 is prevented from rotating. As the connecting plate 14 moves towards the insertion opening 4, the second channel 14b actuates the left sensing rod 7 to resist the force of the second spring 7a and rotate clockwise. Due to the rotation, the small cylinder 11 of the left sensing rod 7 moves towards a position at which the small cylinder 11 is not clamped with the second recess 14d.

When the left sensing rod 7 independently resists the force of the second spring 7a and rotates clockwise, the small cylinder 11 is embedded with the second recess 14d to prevent the left sensing rod 7 from rotating. At this point, as the connecting plate 14 cannot move towards the insertion opening 4, the right sensing rod 6 does not rotate.

A first switch, a second switch and a third switch are arranged at the left end of the resin substrate 5, wherein the first switch 15 actuates a motor (not shown in the figure) to start during the ON operation and is used for starting a CD conveying mechanism and a CD clamping device; the third switch 16 is used for actuating the motor to stop rotating when the CD is retained on the rotary disk 3 by the clamping device; and the second switch 17 acts on a CD determination circuit, is used for improving the power of a rotary disc motor (not shown in the figure) when the switch is in the ON state, and has the function of stopping the operation of conveying a major-diameter CD B when the major-diameter CD B is conveyed to the insertion opening 4 by an ejecting operation. Moreover, a first cam 7b clamped with the first switch 15 and a second cam 7c clamped with the second switch 17 are formed on the left sensing rod 7; the first cam 7b actuates the first switch 15 to the ON position when the left sensing rod 7 slightly rotates clockwise; and the second cam 7c actuates the second switch 17 to the ON position when the left sensing rod 7 rotates clockwise to the vicinity of the terminal.

Moreover, a first rotary plate 20 with a bolt 20a is arranged at the right end of the resin substrate 5 and driven to rotate by the periphery of the major-diameter CD B as the bolt 20a is slideably connected with the periphery of the major-diameter CD B and the elasticity of a third spring 20c connected with the first rotary plate 20 is resisted; and a clamping bolt 20b of the first rotary plate 20 is clamped with a cam hole 6b of the right sensing rod 6 during the rotation is formed on the first rotary plate 20. The clamping bolt 20b is clamped with the cam hole 6b when the right sensing rod 6 rotates substantially and the major-diameter CD B is mounted on the rotary disk 3, and has the function of enabling the right sensing rod 6 to stop at a substantial rotation position. In addition, the upper baseplate 1 is provided with a second rotary plate 21, a trigger rod 25 and a CD stopper 22, wherein the second rotary plate 21 is driven to rotate by receiving the rotation of the first rotary plate 20; the trigger rod 25 actuates the clamping device when the center of the major-diameter or minor-diameter CD is conveyed to the rotary disk; and the CD stopper 22 is used for stopping the operation of conveying a minor-diameter A when the center of the minor-diameter CD A is conveyed to the rotary disk 3. Moreover, the upper baseplate 1 is also provided with a slide plate 23 used for enabling the CD stopper 22 to be retracted from the CD conveying path via the sliding of the second rotary plate 21 towards one side when the second rotary plate 21 rotates. In addition, a conveying roller 24 is arranged under the resin substrate 5, at a position near the insertion opening 4, and is used for clamping the CD inserted into the insertion opening 4, on the resin substrate 5, and conveying the CD between the insertion opening 4 and the playback position when driven to rotate by receiving the rotation of the motor.

The operation of the CD player of the invention is illustrated with reference to FIGS. 3 to 8.

Figure 3:
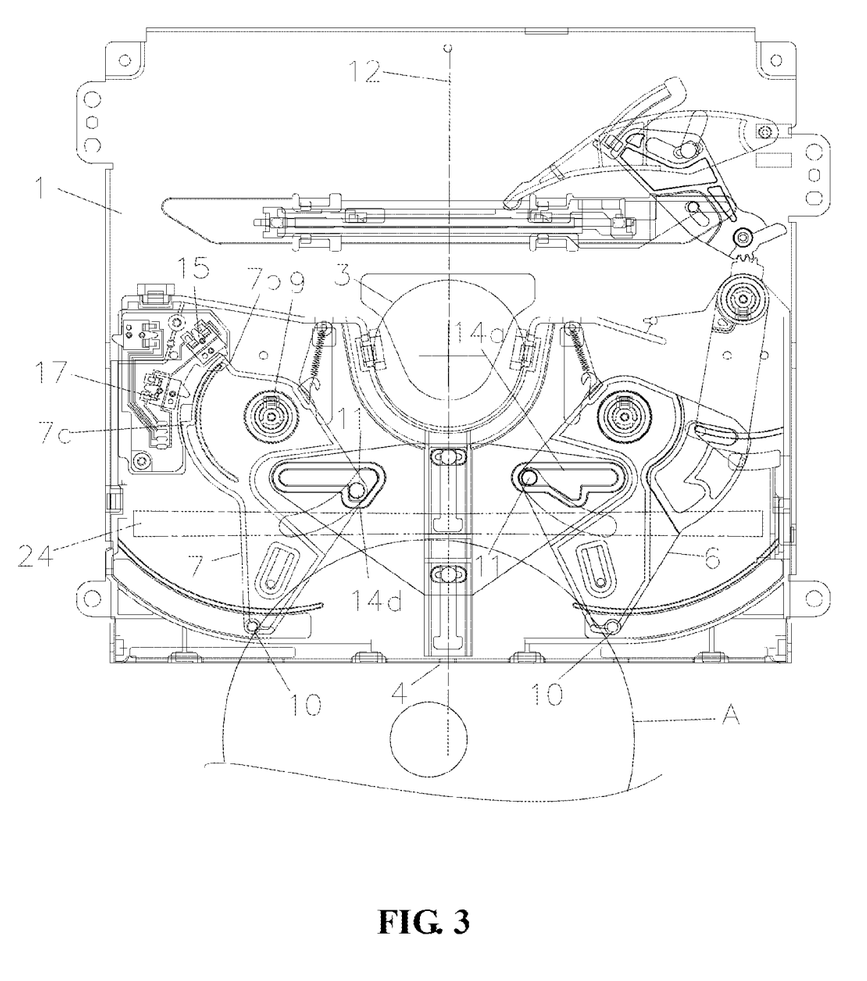
FIG. 3 is a state diagram of the CD player when a minor-diameter CD is inserted towards the left side of an insertion opening.

FIG. 3 illustrates the state when the minor-diameter CD A is inserted towards the left side of the insertion opening 4 with the center being deviated from the centerline 12 of the CD conveying path. At this point, the left sensing rod 7 rotates clockwise by taking the second shaft 9 as the center, and is prevented from rotating as the small cylinder 11 of the left sensing rod 7 is embedded with the second recess 14d at this point. In addition, due to the rotation of the left sensing rod 7, the first switch 15 is changed to be in the ON state, and the motor is started. Moreover, the minor-diameter CD A has to move towards the right side, so that the right sensing rod 6 rotates counterclockwise. Due to the rotation of the right sensing rod 6, the small cylinder 11 of the right sensing rod 6 actuates the first channel 14a so that the connecting plate 14 moves towards the insertion opening 4. Due to the movement of the connecting plate 14, the small cylinder 11 of the left sensing rod 7 is disengaged from the second recess 14d, so that the embedding is released. Hence, the left sensing rod 7 is actuated by the minor-diameter CD A and can rotate clockwise. Due to the rotation, the minor-diameter CD A is conveyed to the rotary disk 3 by the rotary conveying roller 24.

Figure 4:
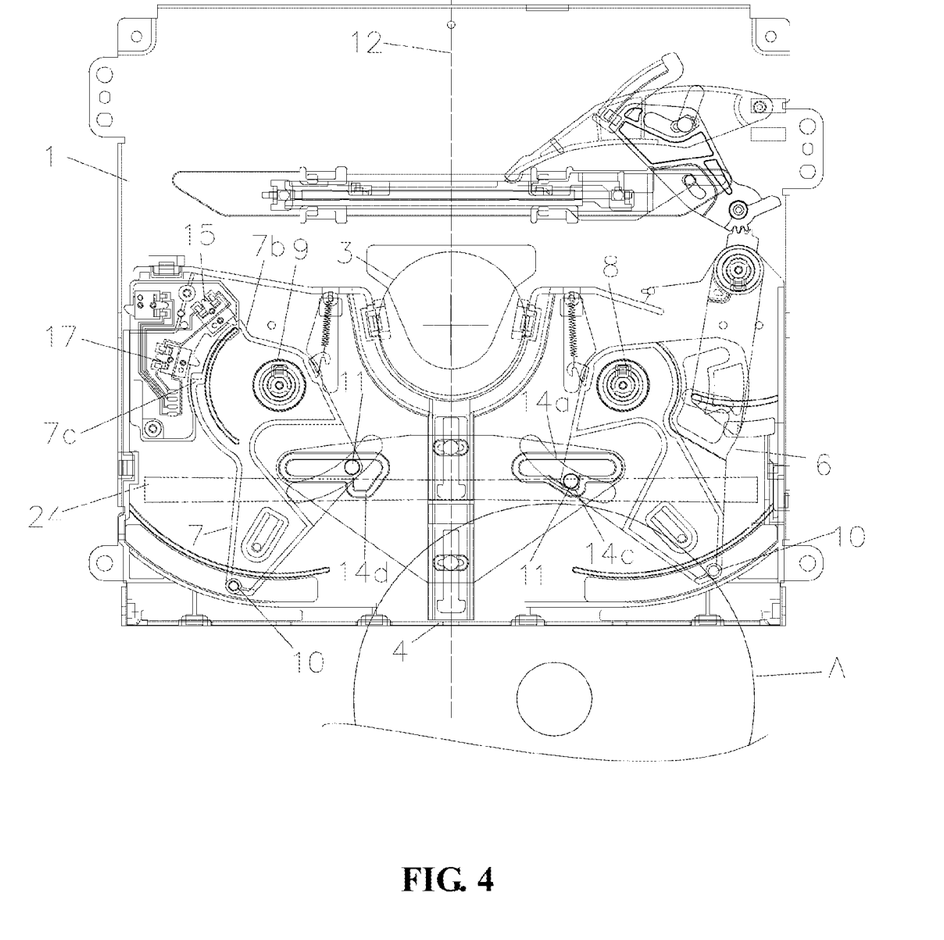
FIG. 4 is a state diagram of the CD player when the minor-diameter CD is inserted towards the right side of the insertion opening.

FIG. 4 illustrates the state when the minor-diameter CD A is inserted towards the right side of the insertion opening 4 with the center being deviated from the centerline 12 of the CD conveying path. At this point, the right sensing rod 6 rotates counterclockwise by taking the first shaft 8 as the center. In addition, the small cylinder 11 of the right sensing rod 6 actuates the first channel 14a so that the connecting plate is driven to move towards the insertion opening 4, and hence is embedded with the first recess 14c to prevent the right sensing rod 6 from rotating. The rotation amount of the right sensing rod 6 at this point is half of the maximum rotation amount of the right sensing rod 6. With the rotation of the right sensing rod 6, once the connecting plate 14 moves towards the insertion opening 4, the left sensing rod 7 is actuated by the second channel 14b to rotate clockwise; and the first switch 15 is changed to be in the ON state, and the motor is started. But at this point, as the minor-diameter CD A is not conveyed as not being clamped by the conveying roller 24 and the resin substrate. In addition, as the right sensing rod 6 is prevented from rotating, the minor-diameter CD A has to move towards the left side. Hence, the center of the minor-diameter CD A is adjacent to the centerline 12 of the CD conveying path. Moreover, once the front end of the minor-diameter CD A is clamped by the conveying roller 24 and the resin substrate 5, the minor-diameter CD A is conveyed to the rotary disk due to the rotation of the conveying roller 24.

Figure 5:
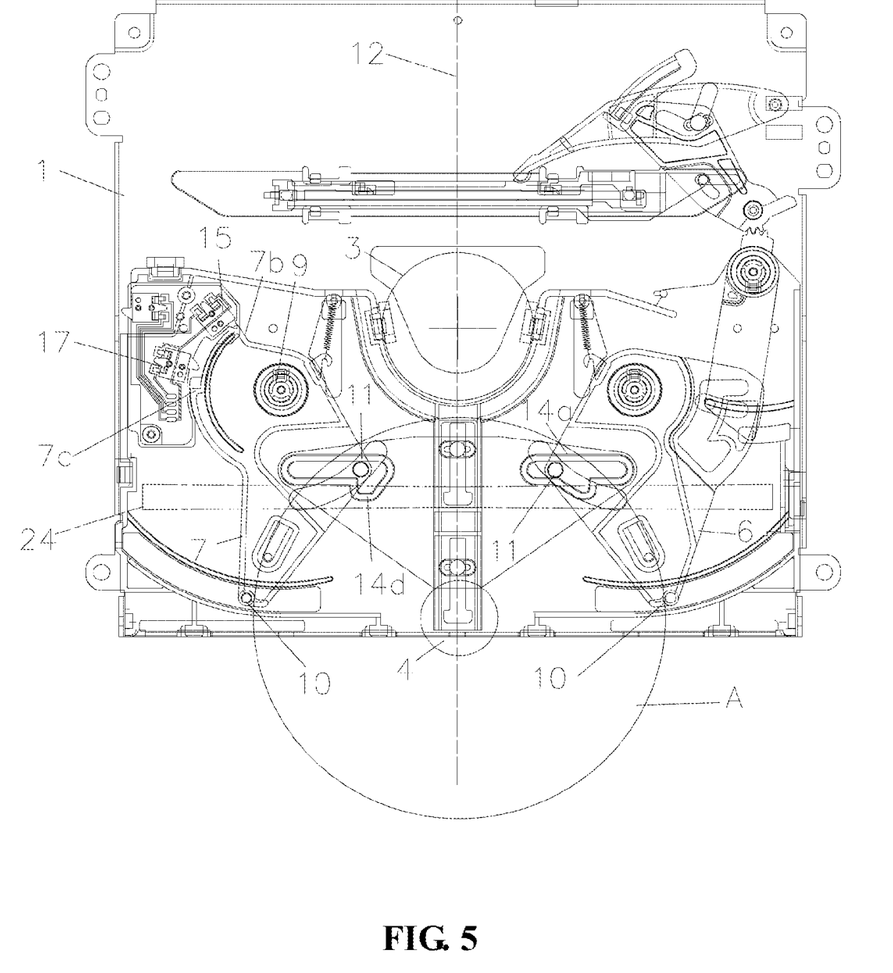
FIG. 5 is a state diagram of the CD player when the minor-diameter CD is conveyed.

FIG. 5 illustrates the state when the minor-diameter CD A is conveyed to the rotary disk 3. When the minor-diameter CD A is conveyed to the rotary disk 3, as the conveying roller 24 takes the shape of a bipyramid of which the diameter of two end portions is more than that of a central portion, the minor-diameter CD A is conveyed by enabling the center of the minor-diameter CD A to be adjacent to the centerline 12 of the CD conveying path. Moreover, when a portion with the maximum outside diameter of the minor-diameter CD A passes through the sensing bolts 10 of the left sensing rod 7 and the right sensing rod 6, as the rotation amount of the left sensing rod 7 has not reached the maximum, the second switch 17 does not operate. As a result, the malfunction of the major-diameter CD detection switch (the second switch 17) can be avoided. Moreover, once the second switch 17 does not operate after the first switch 15 operates, the CD determination circuit determines that the minor-diameter CD A is inserted into the insertion opening 4.

Figure 6:
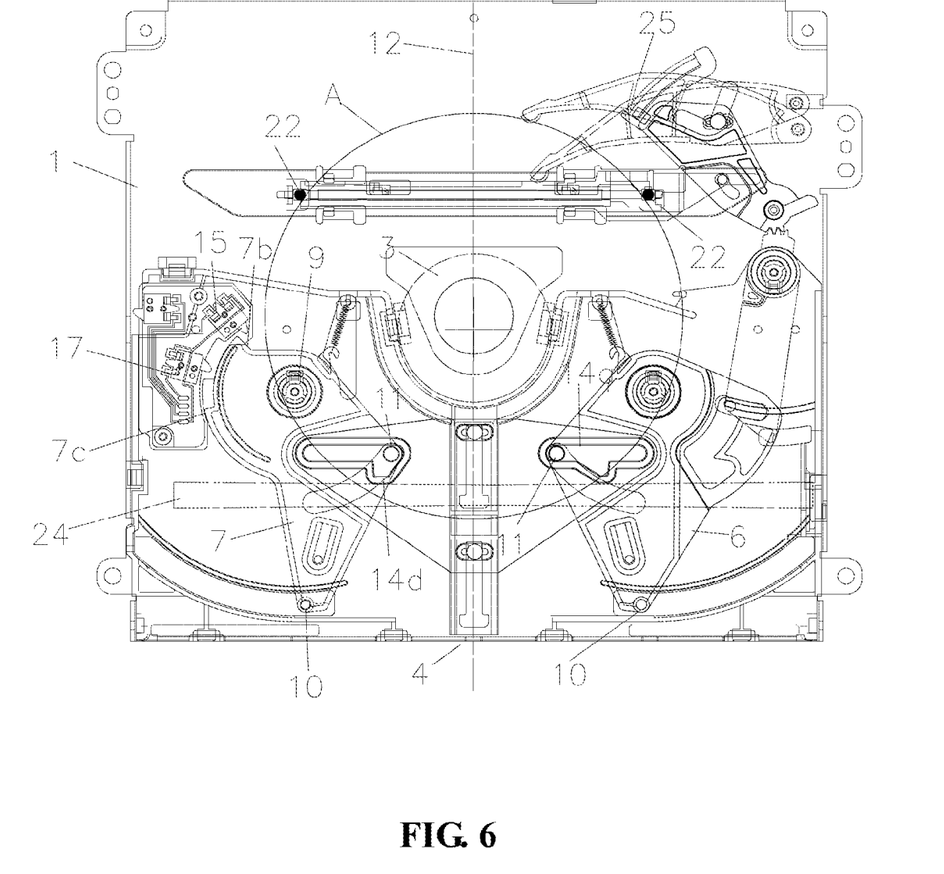
FIG. 6 is a state diagram of the CD player when the minor-diameter CD is conveyed to a position near a playback position.

FIG. 6 illustrates the state when the minor-diameter CD A is conveyed onto the rotary disk 3. When the minor-diameter CD A is conveyed onto the rotary disk 3, the periphery at the front end of the minor-diameter CD A abuts against the trigger rod 25 so that the trigger rod 25 is driven to rotate from a position represented by a dotted line to a position represented by a solid line. Due to the rotation of the trigger rod 25, the clamping device (not shown in the figure) is triggered to operate. In addition, the periphery at the front end of the minor-diameter CD A abuts against the CD stopper 22 at a position at which the center of the minor-diameter CD A is slightly over the center of the rotary disk 3, so that the conveying operation can be stopped. Subsequently, due to the operation of the clamping device, the minor-diameter CD A is clamped by the rotary disk 3 and subjected to playback.

Figure 7:
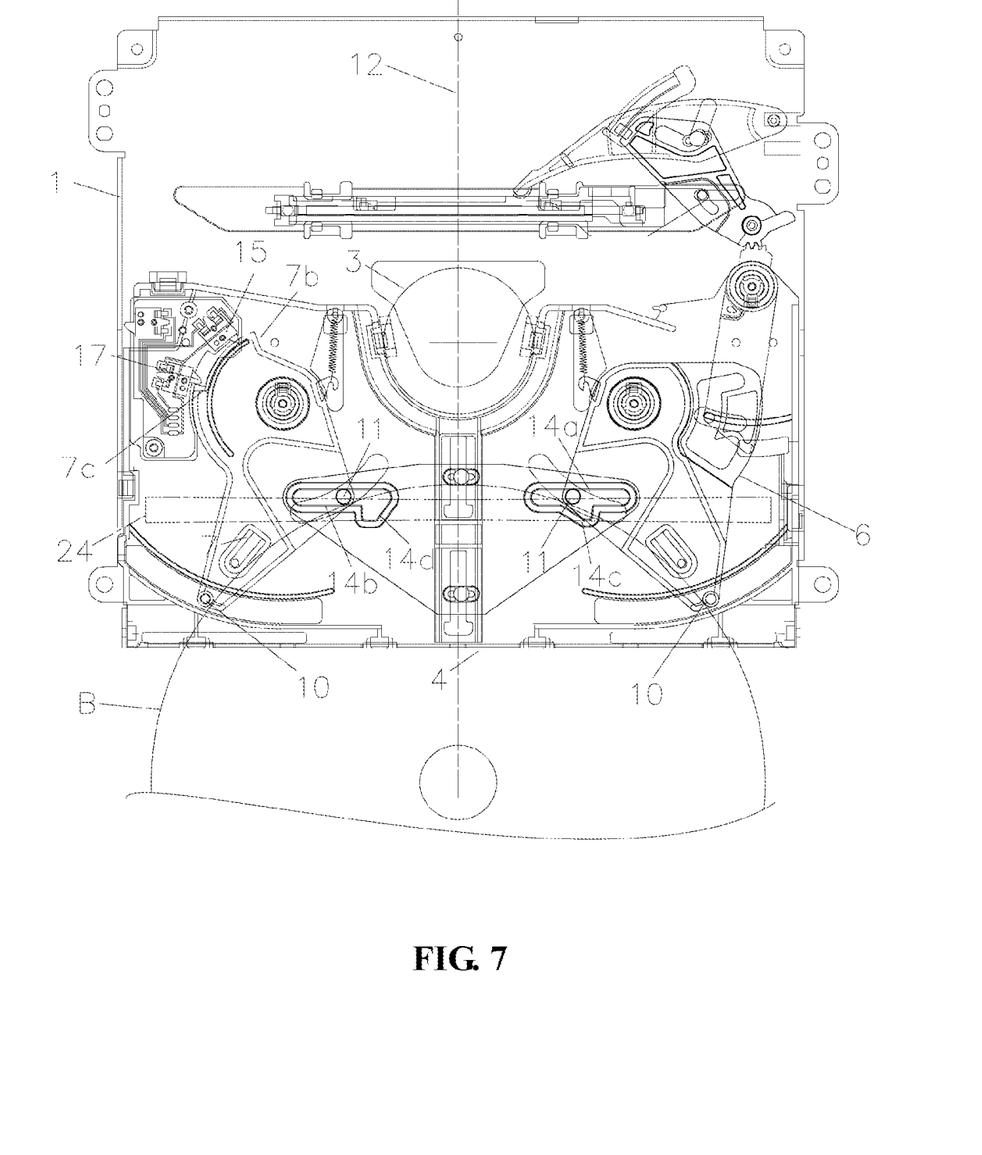
FIG. 7 is a state diagram of the CD player when a major-diameter CD is inserted into the insertion opening.

FIG. 7 illustrates the state when the major-diameter CD B is inserted into the insertion opening 4. At this point, the left sensing rod 7 and the right sensing rod 6 almost rotate clockwise and counterclockwise respectively at the same time, so that the connecting plate 14 is driven to move towards the insertion opening 4. Moreover, even the center of the major-diameter CD B is deviated from the centerline 12 of the CD conveying path, the center of the major-diameter CD B may be pulled back towards the centerline 12 of the CD conveying path just like the minor-diameter CD A, so that the major-diameter CD B is conveyed via the rotation of the conveying roller 24 by enabling the center of the major-diameter CD B to be consistent with the centerline 12 of the CD conveying path.

Figure 8:
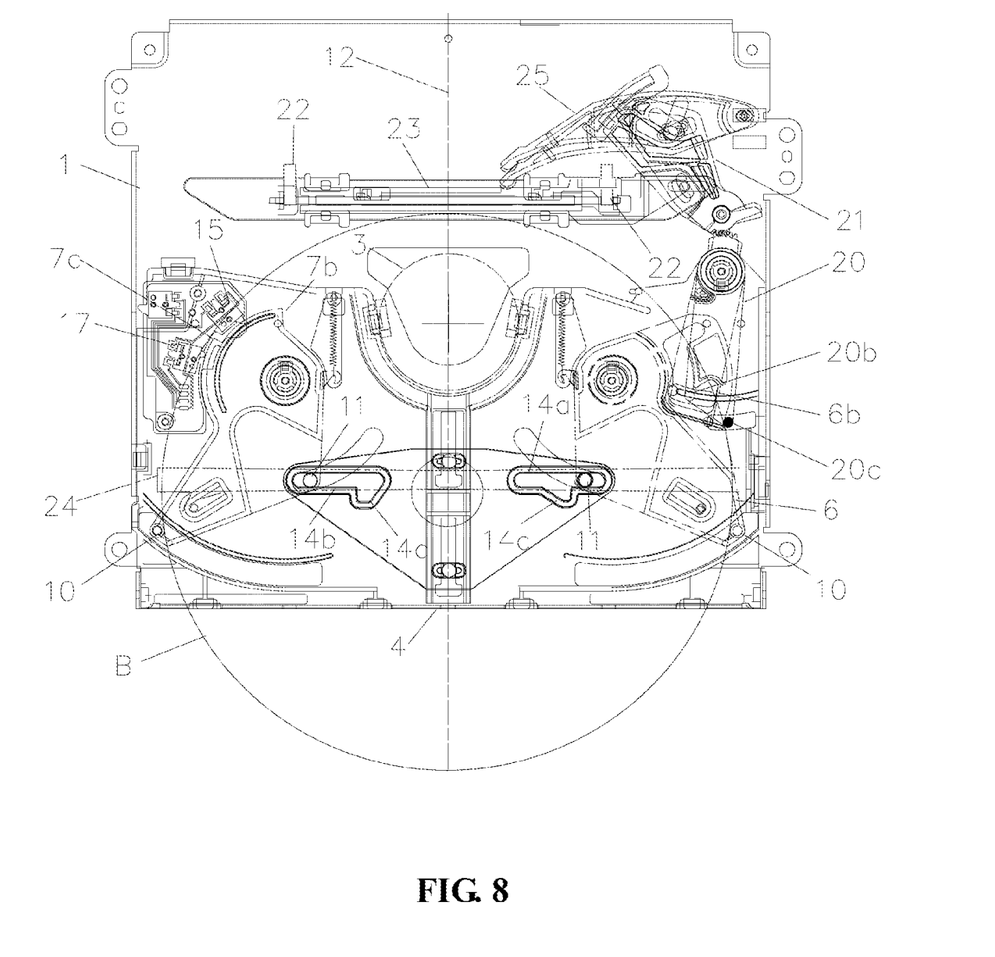
FIG. 8 is a state diagram of the CD player when a second switch operates.

FIG. 8 illustrates the state when a portion with the maximum outside diameter of the major-diameter CD B passes through a middle part of the sensing bolts 10 of the left sensing rod 7 and the right sensing rod 6. At this point, the left sensing rod 7 reaches a position with the maximum rotation amount, and the second switch 17 is changed to be in the ON state. Hence, the CD determination circuit determines that the major-diameter CD B is inserted into the insertion opening. Moreover, the bolt 20*a* of the first rotary plate 20 is driven by the periphery of the major-diameter CD B to rotate from a position represented by the dotted line to a position represented by the solid line. After the rotation of a second rotary plate 21 is received, the slide plate 23 moves towards the right side, so that the CD stopper 22 can be retracted from the CD conveying path, and hence the major-diameter CD B cannot abut against the CD stopper 22. In addition, due to the rotation of the second rotary plate 21, the trigger rod 25 rotates from the position represented by the dotted line to the position represented by the solid line, and the clamping device is prepared for operation. Furthermore, as the clamping bolt 20*b* of the first rotary plate 20 is clamped with the cam hole 6*b*, the right sensing rod 6 is retained at a substantial rotation position, and the second switch 17 is held in the ON state.

In the above embodiment, the right sensing rod 6 is allowed to independently rotate counterclockwise before the small cylinder 11 is embedded with the first recess 14*c*. The rotation amount is approximately half of the maximum rotation amount of the right sensing rod 6. As the right sensing rod 6 is exerted by the rotation amount at the degree, the insertion window of the minor-diameter CD A is widened, so that the insertion window is applicable for the insertion of the minor-diameter CD A. In addition, as the center of the minor-diameter CD A cannot be substantially deviated from the centerline 12 of the CD conveying path, the minor-diameter CD A can be stably mounted on the rotary disk 3.

The vehicle-mounted CD player of the invention is illustrated with the embodiment, and the invention can also adopt a household suction-type CD player.

What is claimed is:

1. A CD player, comprising a conveying roller (24), a first sensing rod (7), a second sensing rod (6), a linkage member (14), a first switch (15) and a second switch (17), wherein the conveying roller (24) is used for conveying a CD from a CD insertion opening (4) to a playback baseplate; the first sensing rod (7) and the second sensing rod (6) are driven to rotate by the periphery of a CD inserted into the insertion opening; the linkage member (14) is used for transmitting the rotation of the first sensing rod to the second sensing rod; the first switch (15) is used for receiving the rotation of the two sensing rods and starting the conveying roller; the second switch (17) is clamped with one sensing rod near rotary terminals of the two sensing rods and used for operating by determining the outside diameter of the CD; and wherein the linkage member includes a first retaining part (14*d*) used for preventing the first sensing rod (7) from rotating independently, a first clamping part (14*b*) used for enabling the linkage member to move towards the insertion opening during the rotation of the first sensing rod, a second retaining part (14*c*) used for preventing the second sensing rod (6) from rotating independently, and a second clamping part (14*a*) used for enabling the linkage member to move towards the insertion opening during the rotation of the second sensing rod;

the first retaining part and the second retaining part are respectively arranged on both sides of a centerline (12) of a CD conveying path and having different distances from the first retaining part and the second retaining part to the centerline of the CD conveying path;

the second sensing rod is used for releasing the behavior of the first retaining part in preventing the first sensing rod from rotating when the first sensing rod is prevented from rotating by the first retaining part; and the first sensing rod is used for releasing the behavior of the second retaining part in preventing the second sensing rod from rotating when the second sensing rod is prevented from rotating by the second retaining part.

2. The CD player according to claim 1, wherein the first retaining part is arranged on an end portion of the first clamping part, adjacent to the center of the CD conveying path, and the second retaining part is arranged in a central portion of the second clamping part.

\* \* \* \* \*